United States Patent [19]

Owens

[11] Patent Number: 4,496,074

[45] Date of Patent: Jan. 29, 1985

[54] NEWSPAPER VENDING MACHINE

[75] Inventor: Walter K. Owens, Florala, Ala.

[73] Assignee: Mfg. Design, Inc., Florala, Ala.

[21] Appl. No.: 407,329

[22] Filed: Aug. 12, 1982

[51] Int. Cl.[3] .................... B65G 59/02; G07F 11/24

[52] U.S. Cl. .................... 221/39; 221/40; 221/227; 221/232; 221/241; 221/259

[58] Field of Search .................... 221/6, 17, 110, 103, 221/155, 227, 230, 232, 259, 36, 39–43, 231, 241

[56] References Cited

U.S. PATENT DOCUMENTS

| | | | |
|---|---|---|---|
| 3,263,859 | 8/1966 | Searle | 221/227 |
| 3,777,929 | 12/1973 | Hannon et al. | 221/39 X |
| 4,174,047 | 11/1979 | Owens | 221/227 X |
| 4,236,650 | 12/1980 | Medley | 221/226 |
| 4,258,861 | 3/1981 | Traill et al. | 221/227 X |
| 4,273,255 | 6/1981 | Overall | 221/227 X |

FOREIGN PATENT DOCUMENTS

| | | | |
|---|---|---|---|
| 2231221 | 12/1974 | France | 221/231 |

*Primary Examiner*—Charles A. Marmor

*Attorney, Agent, or Firm*—B. P. Fishburne, Jr.

[57] ABSTRACT

A vending machine for newspapers and magazines has the capability of dispensing one newspaper at a time to a customer following insertion by the customer of proper coins into a conventional coin mechanism. The insertion of the coins releases a normally locked dispensing lever which the customer need only pull a single time in one direction. A roller activated by the dispensing lever buckles the topmost newspaper in a stack on a biased platform to release the folded edge of the newspaper from beneath a biased hold-down plate, the released newspaper gravitating onto a delivery tray near the bottom of the machine where it can be picked up freely by the customer. The delivery system resets itself automatically for the dispensing of additional newspapers, one at a time, sequentially, from the top of the stack each time the dispensing lever is returned automatically to the non-dispensing position where it remains locked until proper coins are again inserted. The door of the vending machine can be opened to provide access to the last paper in a door compartment or to restock the machine.

10 Claims, 10 Drawing Figures

FIG. 9
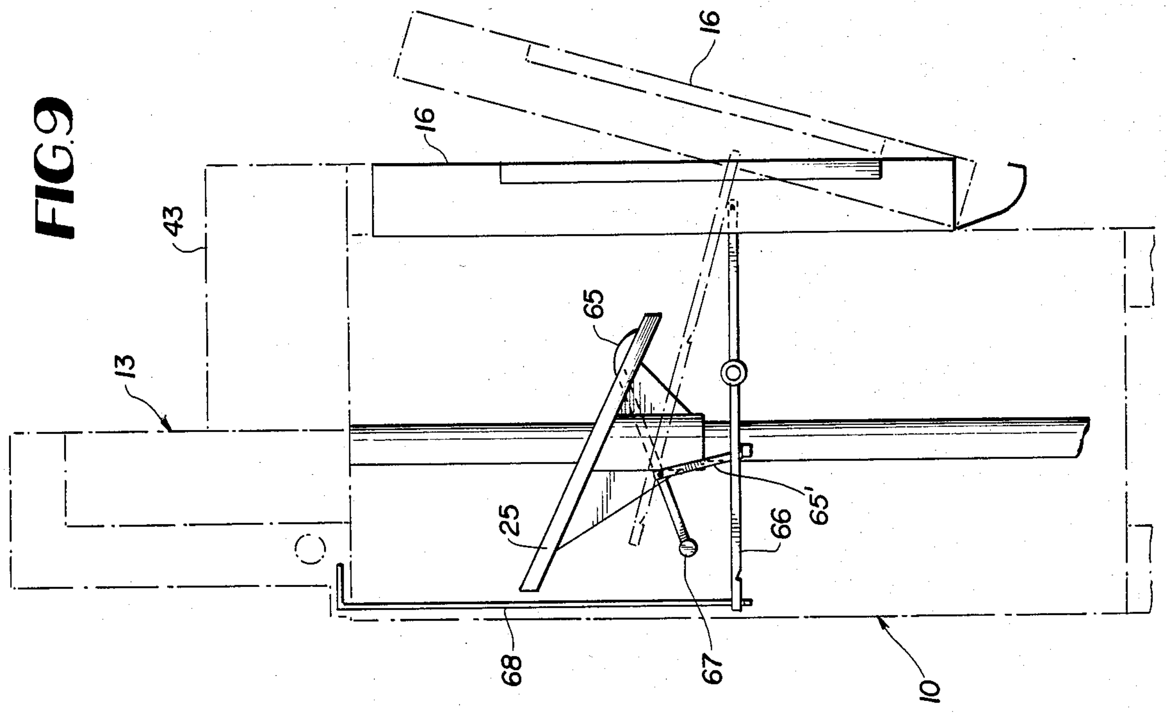
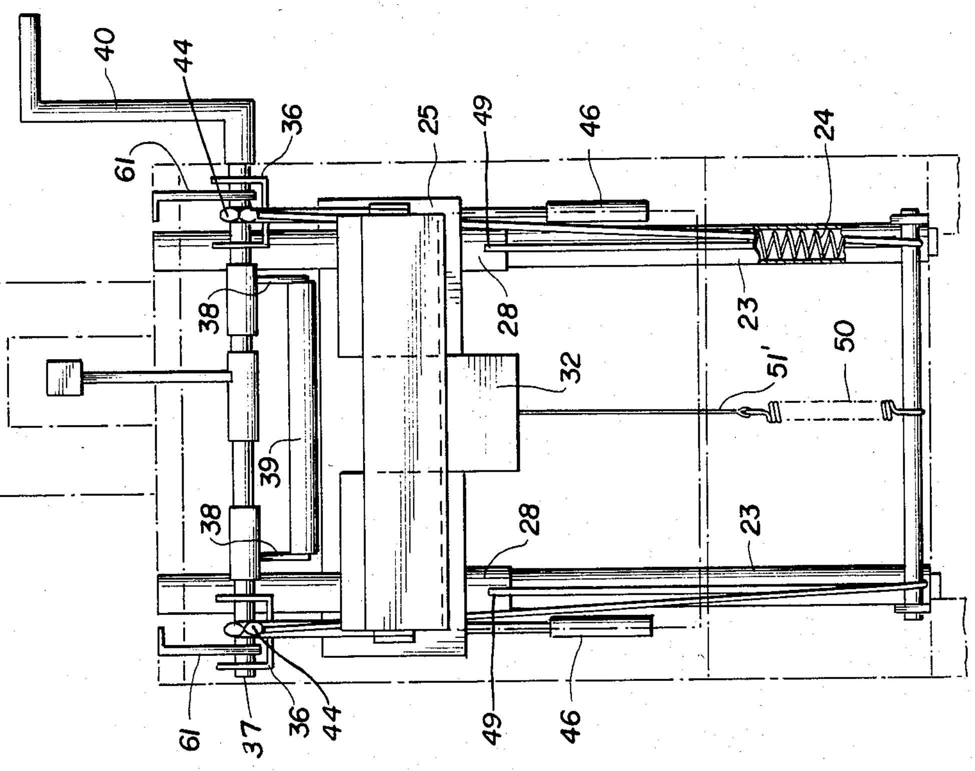
FIG. 7

NEWSPAPER VENDING MACHINE

BACKGROUND OF THE INVENTION

This invention seeks to satisfy a recognized need for a newspaper and magazine vending machine of greater simplicity and durability, which is not sensitive to variations in the thickness of the articles being dispensed, such as daily and Sunday newspapers.

The invention also seeks to eliminate pilferage of newspapers by dishonest customers, as sometimes occurs with the honor system or with machines based on a semi-honor system, where opening of the vending machine door after inserting proper coins allows more than one newspaper to be lifted out.

A further object of the invention is to provide a newspaper vending machine which is reliable and practical, relatively inexpensive to manufacture, rugged and durable, and whose vending mechanism can be installed in new or existing vending machine cabinets.

Other features and advantages of the invention will become apparent during the course of the following detailed description.

BRIEF DESCRIPTION OF THE DRAWINGS

FIG. 7 is a vertical section taken approximately on line 7—7 of FIG. 3, with parts omitted.

FIG. 9 is a partly schematic side elevation of the machine showing a door release and locking mechanism not shown in FIG. 3, other parts omitted.

DETAILED DESCRIPTION

Figure 1:
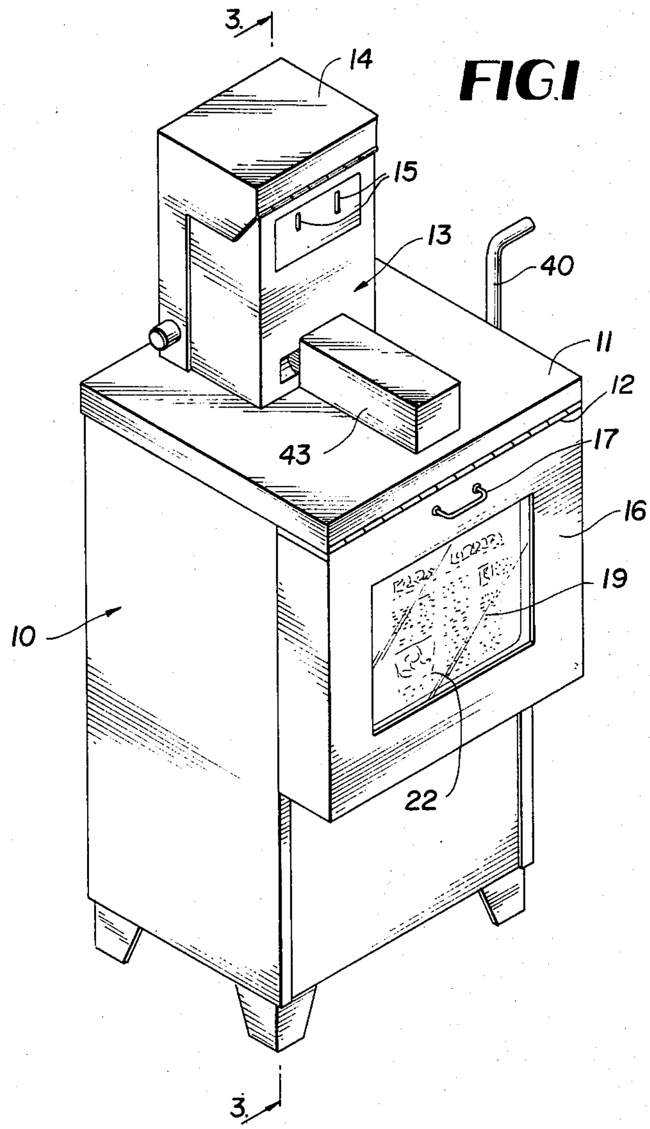
FIG. 1 is a perspective view of a newspaper and magazine vending machine according to the invention.
Figure 2:
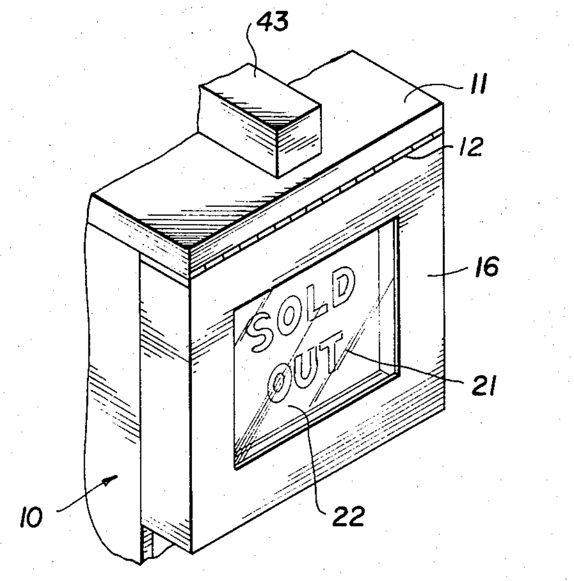
FIG. 2 is a fragmentary perspective view of the door portion of the machine.

Referring to the drawings in detail wherein like numerals designate like parts, a newspaper and magazine vending machine according to the invention comprises an upstanding rectangular cabinet 10 having a normally closed and locked top 11, which can be released at the proper time and elevated on the axis of a hinge 12 at the front of the cabinet adjacent to its top.

A conventional coin mechanism 13 securely fixed to the cabinet top 11 has a hinged lockable access door 14 and coin slots 15 which face the front of the dispensing machine for ready access by a customer.

A front access door 16 having a handle 17 is provided and is releasable at proper times to swing forwardly on a horizontal axis hinge 18 at the bottom of the door. Normally, the door is locked closed. When opened to the position shown in broken lines in FIG. 3, a last newspaper 19 held in a compartment 20 in the door 16 can be lifted out by a customer, following which a "sold-out" sign 21 is displayed through a transparent panel 22 of the door 16.

Within the cabinet 10 vertically are fixed hollow posts 23 containing strong expansible coil springs 24 which constantly bias upwardly an inclined tray 25 supporting a stack of newspapers 26 whose folded edges 27 are arranged forwardly on the tray. The tray 25 carries depending guide sleeves 28 which engage telescopically and slidably over the posts 23 to guide the tray 25 therealong.

Above the tray 25 and above the stack of newspapers thereon is a stabilizing plate 29 having an arched portion 30 above the rear of the stack of newspapers. The plate 29 is fixed to the rear wall of the cabinet 10 near the top of the cabinet.

A very important element of the invention comprises a newspaper hold-down plate 31 which laps the folded edge 27 of the topmost newspaper and has a forward depending extension 32 adjacent to the top of a steeply inclined dispensed newspaper chute 33 having an upturned paper stop lip 34 at its bottom end, below the door 16, whereby a single newspaper can be dispensed to a customer while the door 16 is closed, the bottom of the door 16 having a slot 35 through which each dispensed paper may slide when released by gravity onto the chute 33.

Journaled near the top of the cabinet 10 forwardly of the post 23 in suitable bearings 36 is a rocker shaft 37 carrying a pair of spaced rigid crank arms 38 which supports a preferably elliptical rubber-like single newspaper release roller 39. The arms 38 and the release roller 39 rotate with the shaft 37 under the influence of a customer-operated dispensing lever 40 secured to one end of the shaft 37 and extending adjacent to one side of the cabinet 10 externally thereof.

A locking arm 41 for the rocker shaft 37 fixed thereto has a conventional control element 42 disposed under a housing 43 of the coin mechanism and projecting into such mechanism. Until proper coins are inserted through the slots 15, the conventional mechanism will lock the element 42 and prevent movement of the arm 41 with the shaft 37. Insertion of proper coins, however, will release the element 42, in a well-known manner, so that a customer can pull the dispensing lever 40 forwardly to the dispensing position shown at 40*a* in FIG. 3, the rearward non-dispensing position of the lever being shown at 40*b* in the same figure.

Near its ends, the rocker shaft 37 carries a pair of free-wheeling sprocket gears 44 which are engaged with sprocket chains 45 whose free ends carry counterweights 46 to assure that the chains will have no slack. The chains engage additional free wheeling sprocket gears 47 on fixed shafts 48 at the base of the cabinet 10 near one side of the post 23. The chains then extend upwardly, and have their other ends attached at 49 to the sleeves 28 of each post 23, there being a laterally spaced pair of these posts and a pair of the guide sleeves 28, as best shown in FIG. 7.

The hold-down plate 31 and its extension 32 are biased downwardly into clamping contact with the topmost newspaper 26 on tray or rack 25 by a retractile spring 50 connected by a cable or rod 51, in turn connected to a depending rod extension 52 of hold-down plate 31. The rod extension 52 is guided in its movement by a guide element 53 on the rear of stationary delivery chute 33.

Above the rear unfolded edges of the stacked newspapers 26, a stationary rigid clamping plate 54 engages and applies pressure on the topmost newspaper which is biased upwardly by the action of springs 24, there being a pair of these springs, one in each post 23 acting on the tray 25.

Pairs of discs 55 fixed on the shaft 37 in straddling relationship to chains 45 are interconnected by plates 56 having chain driving tongues 57 adapted to enter between rollers 58 of the chains 45 to drive the latter in one direction each time the dispensing lever 40 is pulled forwardly by a customer to dispense one newspaper into the chute 33.

Figure 3:
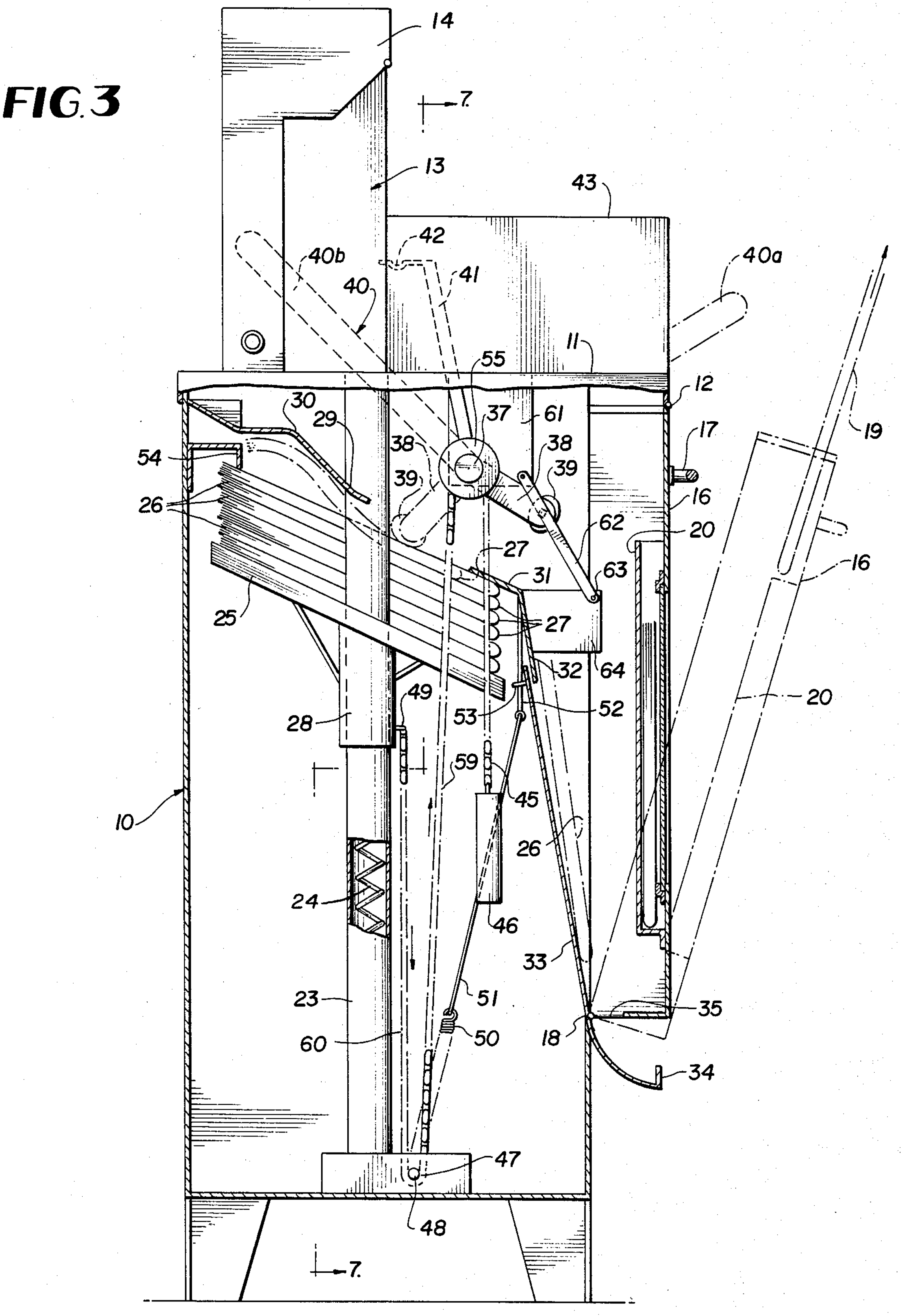
FIG. 3 is an enlarged vertical section taken on line 3—3 of FIG. 1.
Figure 5:
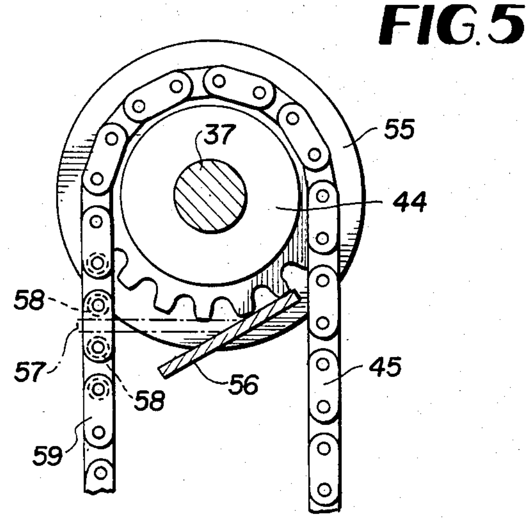
FIG. 5 is an enlarged fragmentary vertical section taken on line 5—5 of FIG. 4.
Figure 6:
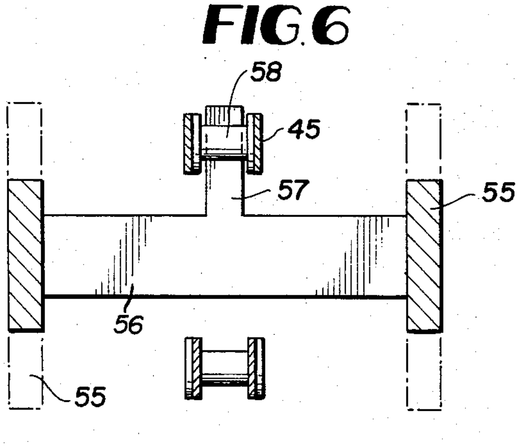
FIG. 6 is an enlarged horizontal section taken on line 6—6 of FIG. 4.
Figure 8:
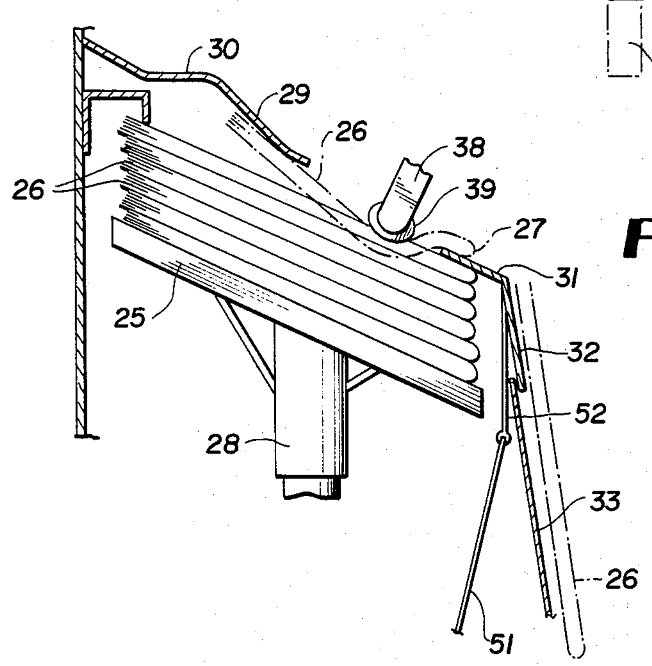
FIG. 8 is an enlarged fragmentary side elevation depicting the dispensing of a single newspaper.

More particularly, when the lever 40 is pulled from position 40*b* to position 40*a*, FIG. 3, the shaft 37 and the newspaper release roller 39 will also move from the full line position to the broken line position in FIG. 3. Simultaneously, the driving tongues 57 enter the rear substantially vertical runs 59 of chains 45 and drive them upwardly as indicated by the arrow in FIG. 3, the adjacent vertical run 60 being pulled downwardly with guide sleeve 28 on each post 23. This lowers the tray 25 somewhat during the dispensing operation to relieve pressure on the newspaper stack at the member 54 to assist in delivering the topmost newspaper into the chute 33, and assuring that only one newspaper will enter this chute.

In moving to the newspaper delivery position, the elliptical roller 39 bears firmly on the topmost newspaper just rearwardly of the hold-down plate 31 and causes the newspaper to bend or buckle as shown in phantom lines in FIG. 3. This bending or buckling will be limited by the stabilizing plate 29 and the resulting foreshortening of the topmost newspaper is sufficient to withdraw its folded end 27 from beneath the hold-down plate 31, whereby the withdrawn topmost newspaper can slide by gravity over the plate 31 and down into the delivery chute 33, as indicated. Since the hold-down plate 31 is always biased downwardly by spring 50, the topmost newspaper 26 separated from the stack by the pressure of roller 39 will have its folded end 27 disposed above the plate 31 substantially the instant that such end is withdrawn from beneath the hold-down plate, even though the upward biasing force on the tray 25 has been momentarily interrupted by the chains 45.

A pair of brackets 61 fixed on rocker shaft 37 are connected to a bar 62 whose lower end is connected at 63 with an extension 64 of floating hold-down plate 31. This arrangement causes the hold-down plate 31 to have its clamping pressure caused by the spring 50 to be momentarily relieved just at the instant when the folded edge 27 of the topmost newspaper is withdrawn from under the plate 31 by the action of release roller 39, as described. Reverse movement of the roller 39 sweeps each released newspaper forwardly toward the chute 33.

Each newspaper 26 in succession is separately dispensed into the chute 33 when the dispensing lever 40 is pulled forwardly once to the position 40*a* and released. The customer simply lifts this newspaper from the bottom of the chute 33.

When the last newspaper on the tray 25 has been dispensed and the tray has reached its maximum height in the vending machine, FIG. 9, the next insertion of coins by a customer into the machine will cause a trigger device 65 to be released by forward pulling of the lever 40 to its position 40*a*. This releasing of the trigger 65 in turn will elevate a lift link 65', connected to a lock bar 66, connected with the front door 16 allowing this door to be pulled open by the customer so that the newspaper 19, FIG. 3, stored in the door compartment 20 can be lifted out, whereupon the "sold-out" sign 21 will be exposed, as previously explained. The trigger 65 is counterweighted at 67 so as to be self-resetting when the door 16 is reclosed. Other desired forms of front door release and relocking mechanisms may be employed.

Means in the form of a portable T-bar 68 for use by authorized personnel, FIG. 9, is provided to allow ready access to the interior of the cabinet 10 at required times for servicing, etc. To enable this, the lid 11 is unlocked and elevated and the T-bar 68 can be raised to elevate the front door lock bar 66 so as to hold the front door in the open position.

Figure 4:
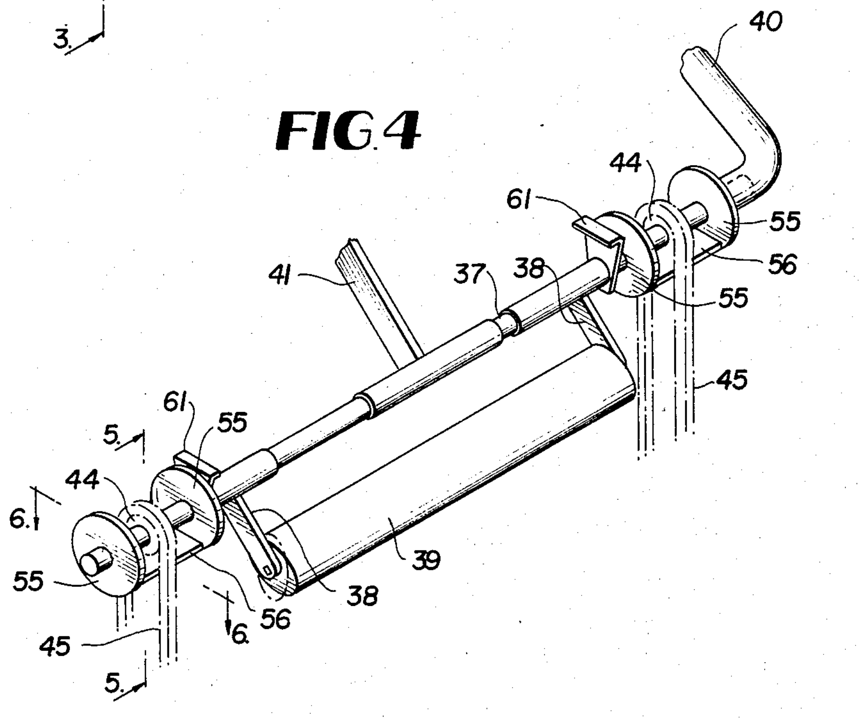
FIG. 4 is a fragmentary perspective view of a lever operated newspaper release roller and associated parts.

As stated, the capability of the vending machine of dispensing newspapers of widely varying thicknesses is an important feature lending to the practicality of the machine. The elliptical newspaper release roller 39 renders this mode of operation practical. As newspapers of different thicknesses are encountered, such as thin daily and thick Sunday papers, the only compensating adjustment required is to rotate the elliptical roller 39 on its axis between the arms 38. When thicker papers are in the machine as illustrated, the major axis of the elliptical roller 39 will be across the arms 38, as shown in FIG. 3 and in full lines in FIG. 4. When thinner papers are being handled, the roller 39 is rotated until its major elliptical axis is substantially longitudinal of the arms 38. All intermediate adjustments can be made by rotation of the roller 39 to handle papers or magazines of any thickness.

Figure 10:
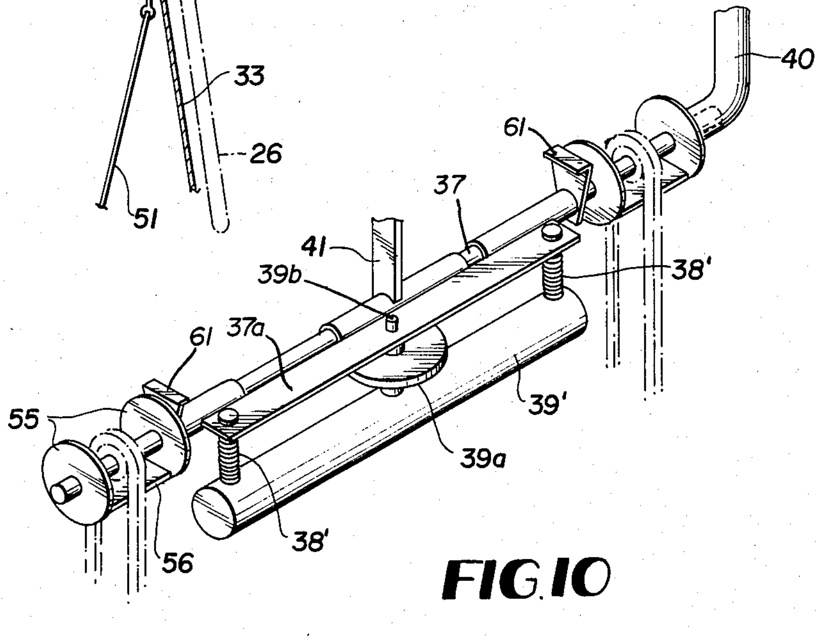
FIG. 10 is a perspective view similar to FIG. 4 showing a modified type of newspaper release roller and adjusting means.

In a modified form of the release mechanism shown in FIG. 10, the elliptical roller 39 is eliminated, and instead a cylindrical roller 39' is dependingly supported on rods secured to a plate 37*a* attached to rocker shaft 37. The roller 39' is biased downwardly by springs 38' and can be adjusted upwardly and downwardly by operation of an adjusting screw shaft 39*b* connected between the plate 37*a* and the roller 39', and having a large manual turning wheel 39*a*.

It can now be seen that a simple, convenient and economical vending machine for newspapers and the like has been provided having a unique mode of operation. The heart of the invention resides in the lever operated release roller 39 which depresses and buckles the topmost paper to effect its release in cooperation with the elements 25, 31 and 29. The mechanism is completely insensitive to the thickness of the papers and will work properly with very thin small town or community newspapers or with very thick big city Sunday editions. Pilferage is entirely eliminated and only one newspaper at a time can be delivered to a customer who must first insert proper coins into a standard coin mechanism with which the dispensing mechanism coacts. The many advantages of the machine over the prior art should be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a newspaper and magazine vending machine, a cabinet body portion, a conventional coin mechanism on the cabinet body portion, fixed vertical guide posts in the cabinet body portion, a vertically movable inclined tray for a stack of newspapers having their folded edges arranged forwardmost on the tray, yielding means biasing the tray and stack of newspapers upwardly, a fixed abutment in the cabinet body portion bearing on the unfolded edge portion of each topmost newspaper in the stack, a hold-down plate in the cabinet body portion overlying and pressing downwardly on the folded edge portion of each topmost newspaper in the stack, yielding means constantly biasing the hold-down plate downwardly relative to the stack of newspapers and said tray, an inclined single newspaper delivery chute at the front of the cabinet body portion from which a customer can receive a single newspaper and being disposed at the forward end of said hold-down plate, a transverse horizontal axis rocker shaft journaled on the cabinet body portion above the hold-down plate and said tray, a dispensing lever secured to the rocker shaft exteriorly of the cabinet body portion and adapted to be pulled forwardly by a customer to a single newspaper dispensing position following insertion of proper coins into said coin mechanism, a control element on the rocker shaft within the cabinet body portion adapted to engage a releasable locking element of the coin mechanism, free wheeling sprocket gears on the rocker shaft in the cabinet body portion, sprocket chains engaged with said sprocket gears and descending therefrom and engaging guides near the bottom of the cabinet body portion and then ascending and being connected with a part of said tray, drivers for said sprocket chains on the rocker shaft and turning therewith so that the chains are driven in one direction when said dispensing lever is pulled to the single newspaper dispensing position to thereby momentarily relieve the tray from its upward biasing force, and a newspaper release roller carried by the rocker shaft in eccentric relation thereto and being movable by the rocker shaft into pressure contact with each topmost newspaper so as to distort the same and thus effect withdrawal of its folded forward edge from beneath said hold-down plate, whereby such withdrawn newspaper can then gravitate with the assistance of said roller during its return stroke into said delivery chute.

2. In a newspaper and magazine vending machine as defined in claim 1, and said newspaper release roller comprising a rubber-like elliptical roller, and a pair of crank arms on the rocker shaft projecting radially thereof and carrying the elliptical release roller.

3. In a newspaper and magazine vending machine as defined in claim 2, and an arched stabilizing plate fixedly disposed within the cabinet body portion above said fixed abutment and stack of newspapers and serving to limit the degree of elevation of the unfolded edge of each topmost newspaper when the latter is acted upon by said release roller.

4. In a newspaper and magazine vending machine as defined in claim 1, and a depending forward separator extension on the hold-down plate overlapping the top edge of said delivery chute and serving to guide each released newspaper onto said chute.

5. In a newspaper and magazine vending machine as defined in claim 1, and the drivers for said sprocket chains comprising plates having driving tongues fixed on said rocker shaft and turning therewith, said tongues adapted to enter between rollers of the sprocket chains to drive the chains in one direction in response to turning of the rocker shaft by the dispensing lever.

6. A vending machine for newspapers and the like comprising a cabinet body portion having a coin mechanism thereon, an upwardly biased tray for a stack of newspapers or the like within said cabinet, an inclined delivery chute for single dispensed newspapers at the front of the cabinet and forwardly of said tray, a downwardly biased hold-down plate for the stack of newspapers on the tray overlapping the forward edge of each topmost newspaper and being disposed above the top of the delivery chute, a fixed abutment within said cabinet above the rear edge portion of each topmost newspaper in said stack and clampingly engaging the same, a rocker shaft journaled on said cabinet above said stack and having a turning handle exteriorly of the cabinet, a releasable locking element for the rocker shaft on the rocker shaft and engageable with a coin releasable element of said coin mechanism, and a release means for each topmost newspaper in the stack on the rocker shaft and moving in one direction with rotation of the rocker shaft across and in compressive engagement with the topmost newspaper to bend the same and effectively foreshorten it between its forward and rear edges to thereby withdraw the forward edge of the topmost newspaper from beneath said hold-down plate, reverse movement of the release means with reverse rotation of the rocker shaft assisting each released topmost newspaper in moving forwardly across the top of the hold-down plate and into the delivery chute, and means interconnecting the rocker shaft and biased tray operable to relieve the tray of its biasing force during dispensing of each topmost newspaper.

7. A vending machine as defined in claim 6, wherein said release means comprises a roller of friction material carried by the rocker shaft and sweeping over each topmost newspaper in one direction to engage and compress the newspaper rearwardly of the hold-down plate and then sweeping over the newspaper in the opposite direction to assist gravity in propelling each released newspaper toward and into the delivery chute.

8. A vending machine as defined in claim 6, and said means to relieve the tray of its biasing force comprising a one-way chain drive for the tray connected between the tray and said rocker shaft.

9. A vending machine for newspapers and the like as defined in claim 6, and said release means comprising an elliptical roller spaced from one side of the rocker shaft in parallel relation thereto and adapted to be rotated on the longitudinal axis of the roller for adjusting the eccentricity of the elliptical roller relative to the axis of the rocker shaft to enable the release one-by-one of newspapers of different thicknesses.

10. A vending machine for newspapers and the like as defined in claim 6, and the release means including a release roller spaced from one side of and parallel to the rocker shaft, and means to adjust the spacing of said roller relative to the axis of the rocker shaft.

* * * * *